United States Patent
Liu et al.

(10) Patent No.: US 11,217,993 B2
(45) Date of Patent: Jan. 4, 2022

(54) CONVERSION SYSTEM WITH HIGH VOLTAGE SIDE AND LOW VOLTAGE SIDE

(71) Applicant: Delta Electronics (Shanghai) CO., LTD, Shanghai (CN)

(72) Inventors: Teng Liu, Shanghai (CN); Jianping Ying, Shanghai (CN); Yi Zhang, Shanghai (CN); Guangcheng Hu, Shanghai (CN); Xin Wang, Shanghai (CN); Dehai Lou, Shanghai (CN); Yun Cao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/830,327

(22) Filed: Mar. 26, 2020

(65) Prior Publication Data
US 2020/0313554 A1 Oct. 1, 2020

(30) Foreign Application Priority Data

Mar. 27, 2019 (CN) .......................... 201910239680.5

(51) Int. Cl.
*H02J 1/10* (2006.01)
*H02M 3/00* (2006.01)
(Continued)

(52) U.S. Cl.
CPC ........... *H02J 1/102* (2013.01); *H02M 1/0074* (2021.05); *H02M 1/325* (2021.05); *H02M 1/36* (2013.01); *H02M 3/00* (2013.01)

(58) Field of Classification Search
CPC ...... H02J 1/00; H02J 1/10; H02J 1/102; H02J 1/108; H02M 1/0074; H02M 2001/0074;
(Continued)

(56) References Cited

U.S. PATENT DOCUMENTS

2005/0185430 A1 8/2005 Vinciarelli
2005/0270812 A1* 12/2005 Vinciarelli ............ H02M 3/157
363/65
(Continued)

FOREIGN PATENT DOCUMENTS

CN 2468145 Y 12/2001
CN 102522896 A 6/2012
(Continued)

OTHER PUBLICATIONS

The 1st Office Action dated Apr. 6, 2021 from CN patent application No. 2019102387990.
(Continued)

*Primary Examiner* — Fred E Finch, III
(74) *Attorney, Agent, or Firm* — Qinghong Xu

(57) ABSTRACT

The present disclosure provides a conversion system with a high voltage side and a low voltage side, including: a plurality of power units, each power unit including: a plurality of DC/DC converters, when in normal operation, one part of DC/DC converters being in a working state and other DC/DC converters being in a cold backup state; a plurality of bypass circuits connected in parallel to the corresponding DC/DC converters; a detection unit connected to each DC/DC converter, and detects the DC/DC converter; and a control unit coupled to the detection unit and each of the plurality of DC/DC converters; and a main control unit coupled with each control unit and configured to receive the preset signal of respective control unit and outputs a bypass signal and a release signal to the corresponding control unit according to the preset signal.

14 Claims, 6 Drawing Sheets

(51) Int. Cl.
  *H02M 1/00* (2006.01)
  *H02M 1/32* (2007.01)
  *H02M 1/36* (2007.01)
(58) Field of Classification Search
  CPC ....... H02M 1/0077; H02M 2001/0077; H02M 1/36; H02M 3/00; H02M 3/02; H02M 3/04; H02M 3/10; H02M 3/145; H02M 3/155–1588
  See application file for complete search history.

(56) References Cited

U.S. PATENT DOCUMENTS

| | | | | |
|---|---|---|---|---|
| 2009/0295228 | A1 | 12/2009 | Ochi | |
| 2012/0175962 | A1* | 7/2012 | Zhan | H02J 3/381 307/82 |
| 2015/0326008 | A1 | 11/2015 | Baurle et al. | |
| 2016/0261205 | A1* | 9/2016 | Kolar | H02M 1/32 |
| 2017/0141692 | A1 | 5/2017 | Stewart et al. | |
| 2018/0175724 | A1* | 6/2018 | Liu | H02M 3/04 |
| 2018/0212535 | A1* | 7/2018 | Xia | H02M 7/49 |
| 2020/0091831 | A1* | 3/2020 | Kadota | H02M 3/3376 |
| 2020/0313544 | A1* | 10/2020 | Ying | H02M 3/04 |
| 2021/0028641 | A1* | 1/2021 | Ilic | H02J 7/00304 |
| 2021/0135455 | A1* | 5/2021 | Marinopoulos | H02S 40/32 |

FOREIGN PATENT DOCUMENTS

| | | |
|---|---|---|
| CN | 104052292 A | 9/2014 |
| CN | 203967989 U | 11/2014 |
| CN | 104466907 A | 3/2015 |
| CN | 204741270 U | 11/2015 |
| CN | 103746553 B | 2/2016 |
| CN | 205017003 U | 2/2016 |
| CN | 103633623 B | 9/2016 |
| CN | 205620728 U | 10/2016 |
| CN | 106099881 A | 11/2016 |
| CN | 107040153 A | 8/2017 |
| CN | 107124096 A | 9/2017 |
| CN | 107332443 A | 11/2017 |
| CN | 107529683 A | 1/2018 |
| CN | 207010253 U | 2/2018 |
| CN | 108322056 A | 7/2018 |
| CN | 108347180 A | 7/2018 |

OTHER PUBLICATIONS

The 1st Office Action dated Apr. 1, 2021 from CN patent application No. 2019102396805.
DC Solid State Transformer Based on Multilevel DC Link for Medium-voltage DC Distribution Application.
A modular DC-DC converter with collapsible input voltage of series connected modules without additional bypass switch.
Digital control of IGBTs for module shutdown in input-series and output-parallel connected modular DC-DC converter.
Research on the Key Technologies of Direct Current Transformer Based on Multiple Submodules.
Non-Final OA dated Jul. 28, 2021 for U.S. Appl. No. 16/830,346.
The 2nd Office Action dated Sep. 24, 2021 for CN patent application No. 201910239680.5.
The 2nd Office Action dated Oct. 22, 2021 for CN patent application No. 201910238799.0.

* cited by examiner

CONVERSION SYSTEM WITH HIGH VOLTAGE SIDE AND LOW VOLTAGE SIDE

CROSS REFERENCE

This application is based upon and claims priority to Chinese Patent Application No. 201910239680.5, filed on Mar. 27, 2019, the entire contents thereof are incorporated herein by reference.

TECHNICAL FIELD

The present disclosure relates to the technical field of electric power and electronic conversion, and particularly, relates to a conversion system with a high voltage side and a low voltage side.

BACKGROUND

In the case of high voltage DC-DC conversion, a power electronic conversion system which is formed by a plurality of DC/DC modules connected in series is often adopted to realize a high voltage DC to DC conversion function. It will directly affect the normal work of the entire electronic conversion system when a certain DC/DC module in the electronic conversion system is in a preset state. Therefore, the fault DC/DC module is needed to be bypassed in time to ensure that the electronic conversion system is not affected by the fault DC/DC module and can continue to operate stably.

However, the technology of bypassing the fault DC/DC module in the related art has the following problems.

In the DC/DC conversion structure with a high voltage side in series and a low voltage side in parallel, since the voltage of the low voltage side is maintained unchanged, the voltage gain range of each DC/DC module will be widened by the function of the bypass, thereby the design difficulty of the electronic conversion system is increased, and the conversion efficiency is lowered. Taking N modules as an example, before the fault DC/DC module is bypassed, the voltage gain of each DC/DC module is $M_1=V_{DC2}/(V_{DC1}/N)$, and after the fault DC/DC module is bypassed, the voltage gain of each DC/DC module is changed to $M_2=V_{DC2}/(V_{DC1}/(N-1))$. In the case that the voltages $V_{DC1}$ and $V_{DC2}$ of both sides of the electronic conversion system are not changed, the two voltage gains of $M_1$ and $M_2$ need to be considered in the design process of the converter, and finally the conversion efficiency is affected.

The above information disclosed in the background section is only used for enhancing the understanding of the background of the present disclosure, it may therefore include information that does not constitute prior art known to those skilled in the art.

SUMMARY

The present disclosure provides a conversion system with a high voltage side and a low voltage side.

Other characteristics and advantages of the present disclosure will be apparent from the following detailed description, or learned in part by practicing the present disclosure.

According to an example embodiment of the present disclosure, a conversion system with a high voltage side and a low voltage side is provided. The conversion system includes a plurality of conversion units, each conversion unit including:

a plurality of DC/DC converters, wherein a first side of each of the DC/DC converters is coupled in series to the high voltage side of the conversion system, a second side of each of the DC/DC converters is coupled in parallel to the low voltage side of the conversion system, when the conversion system is in normal operation, one part of DC/DC converters of the plurality of power units are in a working state and other DC/DC converters of the plurality of power units are in a cold backup state;

a plurality of bypass circuits, wherein each bypass circuit is connected in parallel to an input side of the corresponding DC/DC converter;

a detection unit, wherein each detection unit is connected to each of the plurality of DC/DC converters of the power unit, detects a working signal of the DC/DC converter, and generates a detection signal according to the working signal; and a control unit coupled to the detection unit and each of the plurality of DC/DC converters, wherein the control unit is configured to receive the detection signal and determine whether the corresponding DC/DC converter enters into a preset state, and when the corresponding DC/DC converter is in the preset state, the control unit outputs a preset signal; and a main control unit, coupled with each control unit of the plurality of power units, which is configured to receive the preset signal of respective control unit and outputs corresponding bypass signal and release signal to the corresponding control unit according to the preset signal, wherein, at least one of the control units controls the bypass circuit according to the release signal, such that the preset number of the DC/DC converter in the cold backup state is released by turning off the bypass circuit; and at least another one of the control units controls the bypass circuit according to the bypass signal such that the DC/DC converter in the preset state is bypassed by turning on the bypass circuit.

It should be understood that the above general description and the following detailed description are merely exemplary and are not intended to limit the present disclosure.

BRIEF DESCRIPTION OF THE DRAWINGS

The above described and other objects, features and advantages of the present disclosure will become more apparent through referring to the accompanying drawings and describing the example embodiments thereof in detail.

DETAILED DESCRIPTION

Figure 1:
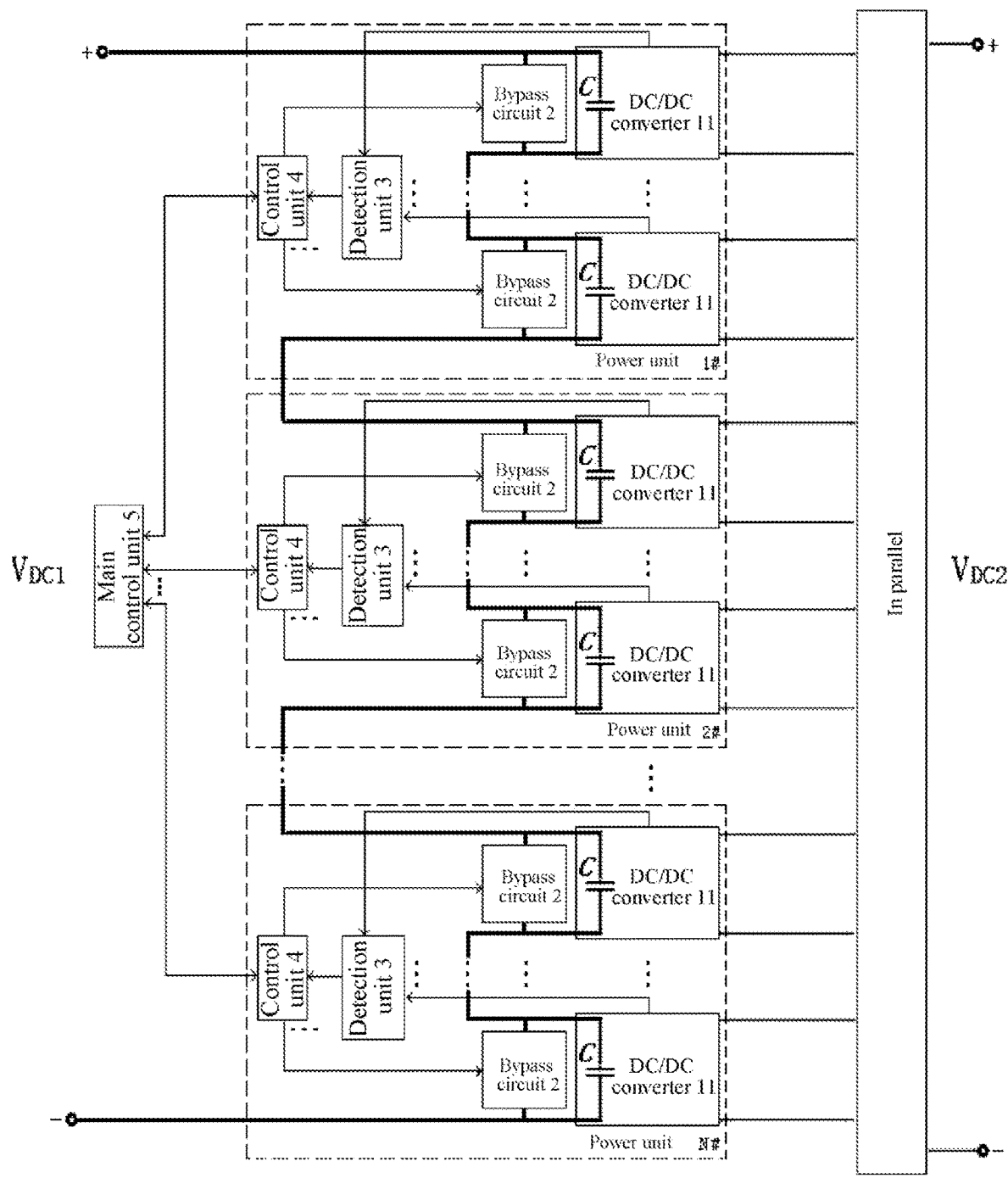
FIG. 1 illustrates a schematic diagram of a conversion system with a high voltage side and a low voltage side according to an example embodiment of the present disclosure.

Now, example embodiments will be described more comprehensively with reference to the accompanying drawings. However, example embodiments may be implemented in many forms, and should not be construed as being limited to the examples set forth herein. On the contrary, these embodiments are provided so that the description of the present disclosure will be more comprehensive and complete, and the concept of the example embodiments is comprehensively conveyed to those skilled in the art. The accompanying drawings are only schematic representations of the present disclosure and are not necessarily drawn by scale.

In addition, the term "couple" as used herein may mean that two or more components are in direct physical or electrical contact with each other, or are in indirect physical or electrical contact with each other. It may also mean that two or more components operate or interact with each other.

Furthermore, the described features, structures or characteristics may be combined in one or more embodiments with any suitable manner. In the following description, numerous particular details are set forth to provide a thorough understanding of the embodiments of the present disclosure. However, those skilled in the art will appreciate that the technical solution of the present disclosure may be practiced with omitting one or more of the particular details, or other methods, components and steps, etc. may be employed. In other instances, the well-known structures, methods, implementations or operations are not shown or described in detail to avoid obscuring the various aspects of the present disclosure.

Some of the block diagrams shown in the accompanying drawings are functional entities and do not necessarily have to correspond to physically or logically separate entities. These functional entities may be implemented in one or more hardware modules or integrated circuits, or implemented in different network and/or processor apparatus and/or microcontroller apparatus.

The purpose of the present disclosure is to disclose a conversion system with a high voltage side and a low voltage side, which includes: a plurality of power units and a main control unit. Each power unit includes a plurality of DC/DC converters. A first side of each of the DC/DC converters is coupled in series to the high voltage side of the conversion system. A second side of each of the DC/DC converters is coupled in parallel to the low voltage side of the conversion system. When the conversion system is in normal operation, one part of DC/DC converters of the plurality of power units are in a working state and other DC/DC converters of the plurality of power units are in a cold backup state. Each power unit further includes a plurality of bypass circuits, where each bypass circuit is connected in parallel to an input side of the corresponding DC/DC converter. Each power unit further includes a detection unit. Each detection unit is connected to each of the plurality of DC/DC converters of the power unit, detects a working signal of the DC/DC converter, and generates a detection signal according to the working signal. Each power unit further includes a control unit. Each control unit is coupled to the detection unit and each of the plurality of DC/DC converters. The control unit is configured to receive the detection signal and determine whether the corresponding DC/DC converter enters into a preset state. A preset signal is generated by the control unit when the corresponding DC/DC converter is in the preset state. The main control unit is coupled with each control unit of the plurality of power units, which is configured to receive the preset signal of respective control unit and outputs corresponding bypass signal and release signal to the corresponding control unit according to the preset signal. At least one of the control units controls the bypass circuit according to the release signal such that the preset number of the DC/DC converter in the cold backup state is released by turning off the bypass circuit. At least another one of the control units controls the bypass circuit according to the bypass signal such that the DC/DC converter in the preset state is bypassed by turning on the bypass circuit. In the present embodiment, the DC/DC converter enters into the cold backup state when the preset state is a non-fault state (such as a non-optimal working state, for example, a voltage of the high voltage side is slightly lower or higher than a rated voltage, a current flowing through a capacitor is slightly large and a working time is too long, etc.). That is, no fault occurs in the DC/DC converter, and the DC/DC converter can still be put into a normal working state. The DC/DC converter enters into a bypass state when the preset state is a fault state. That is, fault occurs in the DC/DC converter, the DC/DC converter is bypassed, and may be put into the normal working state after being replaced. Through the conversion system with a high voltage side and a low voltage side of the present disclosure, the gain variation range of the DC/DC converter is reduced effectively, and the conversion efficiency of each DC/DC converter is improved to some extent. The solution to increase the bus voltage of the DC bus capacitor of the DC/DC converter in the release bypass state to the specified voltage from 0 when the DC/DC converter in the cold backup state is put into operation is given. The solution has a high system efficiency. The bypass of the DC/DC converter in the preset state can be achieved by a device having a relatively small conduction loss, such as a mechanical switch. There is no current flowing in the rest power devices of the DC/DC converter in the preset state, and no loss is generated. The DC/DC converter in the working state is directly connected with the adjacent DC/DC converter through wires, and the loss of the additional device is not generated. The solution of the present disclosure has a small loss, which is benefit to further improve the efficiency of the conversion system. The control solution can be continued after the number of the DC/DC converters in which fault occurs is larger than the number of the DC/DC converters in the cold backup state, and is not limited by the number of the DC/DC converters in the cold backup state.

Figure 2:
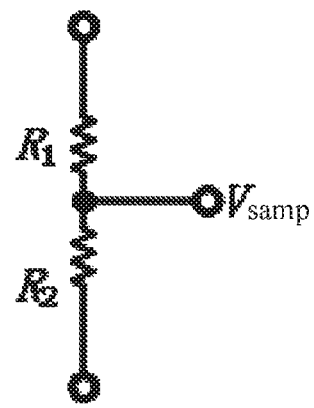
FIG. 2 illustrates a schematic diagram of a resistance voltage sharing circuit.
Figure 3:
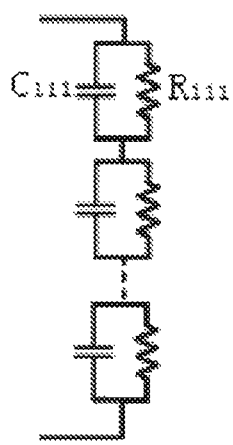
FIG. 3 illustrates a schematic diagram of a voltage equalizing circuit.
Figure 4:
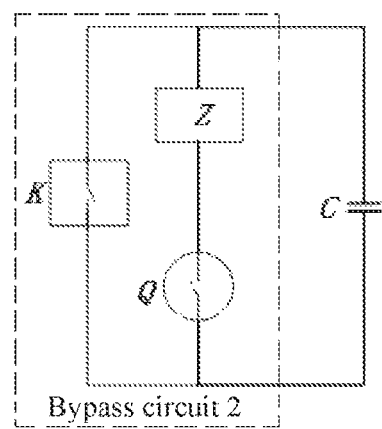
FIG. 4 illustrates a schematic diagram of a bypass circuit.
Figure 5:
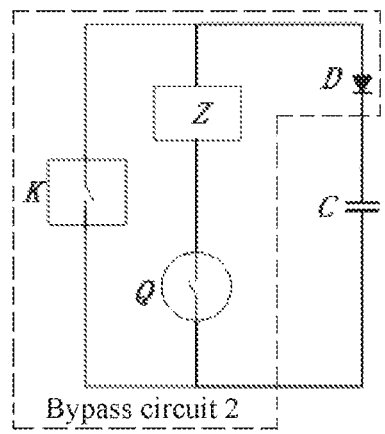
FIG. 5 illustrates a schematic diagram of a bypass circuit with a diode.
Figure 6:
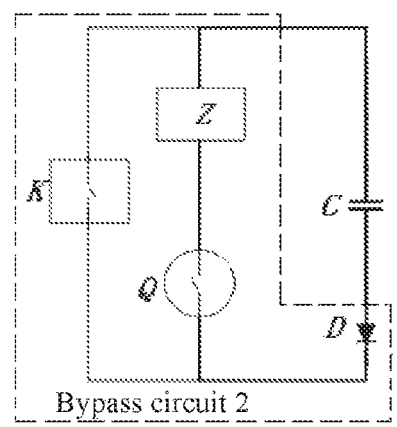
FIG. 6 illustrates a schematic diagram of another bypass circuit with a diode.

The conversion system with a high voltage side and a low voltage side of the present disclosure will be described in detail below in conjunction with FIGS. 1 to 6. FIG. 1 illustrates a schematic diagram of a conversion system with a high voltage side and a low voltage side according to an example embodiment of the present disclosure. FIG. 2 illustrates a schematic diagram of a resistance voltage sharing circuit. FIG. 3 illustrates a schematic diagram of a voltage equalizing circuit. FIG. 4 illustrates a schematic diagram of a bypass circuit. FIG. 5 illustrates a schematic diagram of a bypass circuit with a diode. FIG. 6 illustrates a schematic diagram of another bypass circuit with a diode.

FIG. 1 illustrates a schematic diagram of a conversion system with a high voltage side and a low voltage side according to an example embodiment of the present disclosure. As shown in FIG. 1, the conversion system with a high voltage side and a low voltage side includes a plurality of power units 1, for example, N power units 1 (1#, 2# . . . N#), and a main control unit 5. Each power unit 1 includes a plurality of DC/DC converters 11. A first side of each of the DC/DC converters 11 is coupled in series to the high voltage side of the conversion system. A second side of each of the DC/DC converters 11 is coupled in parallel to the low voltage side of the conversion system. When the conversion system is in normal operation, one part of DC/DC converters 11 of the plurality of power units are in the working state and other DC/DC converters 11 of the plurality of power units are in the cold backup state. Each power unit further includes a plurality of bypass circuits 2. Each of the bypass circuits 2 is connected in parallel to an input side of the corresponding DC/DC converter 11. Each power unit further includes a detection unit 3. Each detection unit 3 is connected to each of the plurality of DC/DC converters 11 of the power unit 1, detects a working signal of the DC/DC converter 11, and generates a detection signal according to the working signal. Each power unit further includes a control unit 4. Each control unit 4 is coupled to the detection unit and each of the plurality of DC/DC converters. The control unit 4 is configured to receive the detection signal and determine whether the corresponding DC/DC converter 11 enters into a preset state. A preset signal is generated by the corresponding control unit 4 when the corresponding DC/DC converter 11 is in the preset state. The main control unit 5 is coupled with each control unit of the plurality of power units, which is configured to receive the preset signal of respective control unit and outputs corresponding bypass signal and release signal to the corresponding control unit 4 according to the preset signal. At least one of the control units 4 controls the bypass circuit 2, such that the preset number of the DC/DC converter 11 in a cold backup state is released by turning off the bypass circuit. At least another one of the control units 4 controls the bypass circuit 2 according to the bypass signal such that the DC/DC converter 11 in the preset state is bypassed by turning on the bypass circuit 2. That is to say, the bypass circuit 2 corresponding to the DC/DC converter 11 in the cold backup state is in a turn-on state, and the bypass circuits (the switch device in the bypass circuit) corresponding to the rest DC/DC converters (in normal working state) are in a turn-off state. It is necessary to put the DC/DC converter 11 in the cold backup state into working when the DC/DC converter 11 in a certain/some certain working states are in a preset state. The bypass circuit 2 (the switch device in the bypass circuit) corresponding to the DC/DC converter 11 in the preset state is controlled to turn on by the control unit, such that the DC/DC converter in the preset state is out of work, and the bypass circuit corresponding to the corresponding number of the DC/DC converters 11 in the cold backup state is turned off, such that the corresponding number of the DC/DC converters 11 in the cold backup state are put into working. Therefore, the conversion system with a high voltage side and a low voltage side of the present disclosure effectively reduces the gain variation range of the DC/DC converter 11, and improves the conversion efficiency of each DC/DC converter 11 to some extent. Meanwhile, the bypass of the DC/DC converter 11 in the preset state can be achieved by a device having a relatively small conduction loss, such as a mechanical switch, etc. There is no current flowing in the rest power devices of the DC/DC converter 11 in the preset state, and no loss is generated. The DC/DC converter 11 in the working state is directly connected to the adjacent DC/DC converter 11 through wires, and no loss of the rest additional device is generated. Therefore, the loss is reduced, and it is benefit to further improve the efficiency of the conversion system.

According to an example embodiment of the present disclosure, the bypass circuit corresponding to the DC/DC converter in the working state is in a turn-off state, and the bypass circuit corresponding to the DC/DC converter in a cold backup state is in a turn-on state.

The detection unit may be various forms of sampling circuits. The working information, such as a voltage, a current and a temperature of the DC/DC converter, which needs attention, is obtained by any form of circuit or component having a function of collecting signals, such as a resistance voltage divider or a current transformer. The control unit 4 and the main control unit 5 both may be implemented by various hardware, software, firmware or a combination thereof. The main control unit 5 maintains communication with the control unit 4 of each power unit 1, and they are cooperated with each other to complete the control of the conversion system.

For example, the detection unit may collect a voltage signal $V_{samp}$ of the DC/DC converter through the resistance voltage sharing circuit (as shown in FIG. 2, the resistance voltage sharing circuit includes resistors R1 and R2), or collecting a current signal of the DC/DC converter through the current transformer cooperating with the resistance voltage sharing. The control unit 4 may be controlled by FPGA, and the main control unit 5 may be constituted by FPGA+DSP. However, the present disclosure is not limited thereto, that is to say, other structures of detection unit, control unit, and main control unit may also be adopted.

According to some embodiments of the present disclosure, the solution to increase the bus voltage of the DC bus capacitor of the DC/DC converter in the release bypass state to the predetermined voltage from 0 when the DC/DC converter in the cold backup state is put into operation is given. The bypass circuit corresponding to the DC/DC converter in the preset state is controlled to turn on by the control unit, in this way, both a non-stop control solution and a stop restart control solution may be adopted. The details will be particularly described below, respectively.

According to an example embodiment of the present disclosure, each of the DC/DC converters 11 further includes a DC bus capacitor C. One end of the corresponding bypass circuit and a positive end of the DC bus capacitor are electrically coupled with a positive end of the first side of the DC/DC converter. The other end of the corresponding bypass circuit and a negative end of the DC bus capacitor C are electrically coupled with a negative end of the first side of the DC/DC converter. When in normal operation, there are k DC/DC converters in the working state, and r DC/DC converters in the cold backup state (k+r=N·n). When a certain DC/DC converter in the working state enters into the preset state, for example, any form of fault state such as overvoltage, overcurrent, undervoltage etc., or the non-optimal working state (i.e., non-fault state) such as the voltage of the high voltage side is slightly lower or higher than the rated voltage, the current flowing through a capacitor is slightly large and the working time is too long, etc., after the working signal of a certain working DC/DC converter is detected by the corresponding detection unit, the detection signal is transmitted to the corresponding control unit, the corresponding control unit determines whether the corresponding DC/DC converter is in the preset state according to the detection signal, and outputs the preset signal to the main control unit. Then, a bypass signal and a release signal are output to the corresponding control unit according to the preset signal by the main control unit. The bypass circuit corresponding to the DC/DC converter in the preset state is controlled to be turned on by at least one control unit, the bypass circuits corresponding to the preset number of the DC/DC converter are controlled to be turned off by at least one control unit to bring them in the release bypass state. After the preset number of the DC/DC converters are controlled to be in the release bypass state according to the release signal by the at least one control unit, where the preset number may be equal to the number of the DC/DC converters in the preset state, or may be smaller than the number of the DC/DC converters in the preset state, the DC bus capacitor of the DC/DC converter in the release bypass state is charged by the current of the high voltage side of the conversion system. After charging to a predetermined voltage, the DC/DC converter in the release bypass state is controlled to enter into the working state. After the bypass signal is received by the control unit corresponding to the DC/DC converter in the preset state, the switch of the bypass circuit of the DC/DC converter in the preset state is controlled to be closed to achieve that the DC/DC converter in the preset state is out of working. Therefore, a bypass control solution without shut-down can be achieved.

If the number of the fault DC/DC converters is larger than r, that is, when the number of the fault DC/DC converters is larger than the number of the DC/DC converters in the cold backup state, the DC/DC converter in the preset state may be controlled to directly exit working, and the voltage of the low voltage side is adjusted to $V_{DC2} \cdot k/j$, where j is the number of the DC/DC converters that are currently in the working state (i.e., after controlling all the bypass circuits corresponding to the DC/DC converters in the preset state to be turned on). That is to say, after the number of the fault DC/DC converters is larger than the number of the DC/DC converters in the cold backup state, the operation can be continued and is not limited by the number of the DC/DC converters in the cold backup state. Moreover, the problem that the range of the voltage gain is widened to cause decrease of the efficiency of the conversion system due to the decrease of the number of the DC/DC converters in the working state is overcome. The gain variation range of the power is effectively reduced, and the conversion efficiency is improved.

According to an example embodiment of the present disclosure, the number of the power units of the conversion system is N, the number of the DC/DC converters of each power unit is n, k DC/DC converters are in the working state and r DC/DC converters are in the cold backup state, the voltage of the high voltage side of the conversion system is $V_{DC1}$, and the voltage of the low voltage side of the conversion system is $V_{DC2}$, wherein $k+r=N \cdot n$, $N \geq 1$, and $n \geq 1$.

According to an example embodiment of the present disclosure, the voltage of the low voltage side of the conversion system remains $V_{DC2}$ when the number of the DC/DC converters in the preset state in which fault occurs is less than or equal to r. That is to say, the number of the DC/DC converters in the cold backup state is not larger than the number of the DC/DC converters in the preset state in which fault occurs, so that the power capacity of the entire conversion system is ensured while having a high stability and reliability with a certain number of the DC/DC converters in the working state. However, the present disclosure is not limited thereto. That is to say, the number of the DC/DC converters in the cold backup state may also be larger than the number of the DC/DC converters in the preset state in which fault occurs, to further ensure the stability and reliability of the entire system.

According to an example embodiment of the present disclosure, the preset number may be larger than, equal to or less than the number of the DC/DC converters in the preset state.

According to an example embodiment of the present disclosure, each of the DC/DC converters 11 further includes a DC bus capacitor C. One end of the corresponding bypass circuit and the positive end of the DC bus capacitor are electrically coupled with the positive end of the first side of the DC/DC converter. The other end of the corresponding bypass circuit and the negative end of the DC bus capacitor are electrically coupled with the negative end of the first side of the DC/DC converter. When in normal operation, there are k DC/DC converters in the working state, and the rest r DC/DC converters are in the cold backup state ($k+r=N \cdot n$). When none of the DC/DC converters is in the preset state, the number k of the DC/DC converters in the working state and the number r of the DC/DC converters in the cold backup state are equal to the total number of the DC/DC converters in the conversion system, that is, $k+r=N \cdot n$. When a certain DC/DC converter in the working state enters into the preset state, for example, any form of fault state such as overvoltage, overcurrent, and undervoltage, or the non-optimal working state (i.e., non-fault state) such as the voltage of the high voltage side is slightly lower or higher than the rated voltage, the current flowing through a capacitor is slightly large and the working time is too long, after the corresponding control unit determines that a certain working DC/DC converter enters into the preset state, a preset signal is output to the main control unit by the corresponding control unit. Then, a bypass signal and a release signal are output to the corresponding control unit according to the preset signal by the main control unit. The conversion system is controlled to shut down before a preset number of the DC/DC converters are controlled to be in a release bypass state by at least one control unit. When the bypass circuits corresponding to a preset number of the DC/DC converters in the cold backup state are controlled to be turned off by at least one control unit, the preset number of the DC/DC converters in the cold backup state are in the release bypass state. The DC bus capacitor of the DC/DC converter in the release bypass state is charged, and after being charged to a predetermined voltage, the DC/DC converter in the preset state is controlled to exit working. Finally, the conversion system is controlled to restart. After the restart, the entire conversion system still has k DC/DC converters in the working state. Therefore, a bypass control solution in which the conversion system shuts down and then restarts can be achieved.

Similarly, when the number of the fault DC/DC converters is larger than r, that is, when the number of DC/DC converters in which fault occurs is larger than the number of the DC/DC converters in the cold backup state initially, the fault DC/DC converter is controlled to directly exit working by the control unit, and the voltage of the low voltage side is adjusted to $V_{DC2} \cdot k/j$, where j is the number of the DC/DC converters in the working state currently, $j<k$. That is to say, after the number of the DC/DC converters in the preset state is larger than the number of the DC/DC converters in the cold backup state, the operation can be continued and is not limited by the number of the DC/DC converters in the cold backup state. Moreover, the problem that the range of the voltage gain is widened to cause the efficiency of the conversion system down due to the decrease of the number of the DC/DC converters in the working state is overcome. The gain variation range of the power is effectively reduced, and the conversion efficiency is improved.

According to an example embodiment of the present disclosure, each of the DC/DC converters 11 further includes a DC bus capacitor C and a voltage equalizing circuit 111 (as shown in FIG. 3, the voltage equalizing circuit 111 includes a plurality of resistors $R_{111}$ or a series branch constituted by a resistor and a controllable switch device). One end of the bypass circuit and the positive end of the DC bus capacitor are electrically coupled with the positive end of the first side of the DC/DC converter, and the other end of the bypass circuit and the negative end of the DC bus capacitor are electrically coupled with the negative end of the first side of the DC/DC converter. The voltage equalizing circuit is connected in parallel to the positive end and the negative end of the bus capacitor. When in normal operation, there are k DC/DC converters in the working state, and the rest r DC/DC converters are in the cold backup state (k+r=N·n). When a certain DC/DC converter in the working state is in the preset state, for example, any form of fault state such as overvoltage, overcurrent, undervoltage, or the non-optimal working state such as the voltage of the high voltage side is slightly lower or higher than the rated voltage, the current flowing through a capacitor is slightly large and the working time is too long, after the corresponding control unit determines that a certain working DC/DC converter enters into the preset state, a preset signal is output to the main control unit by the corresponding present control unit. Then, a bypass signal and a release signal are output to the corresponding control unit according to the preset signal by the main control unit. The conversion system is controlled to shut down before a preset number of the DC/DC converters are controlled to be in the release bypass state by at least one control unit. When the bypass circuits corresponding to the preset number of the DC/DC converter in the cold backup state are controlled to be turned off by at least one control unit, the preset number of DC/DC converters in the cold backup state are in the release bypass state. The DC bus capacitor of the DC/DC converter in the release bypass state is charged, after a preset time is passed, the DC bus capacitor enters into a stable state, and then the DC/DC converter in the preset state is controlled to exit working. Finally, the conversion system is controlled to restart. After the restart, the entire conversion system still has k DC/DC converters in the working state. Therefore, another bypass control solution in which the conversion system shuts down and then restarts can be achieved.

According to an example embodiment of the present disclosure, each of the DC/DC converters 11 includes a DC bus capacitor C. The positive end of the DC bus capacitor is electrically coupled with the positive end of one side of the DC/DC converter. The negative end of the DC bus capacitor is electrically coupled with the negative end of one side of the DC/DC converter. Each of the bypass circuits 2 includes a mechanical switch unit K, an impedance network Z and a semiconductor switch unit Q (as shown in FIG. 4). The semiconductor switch unit Q and the impedance network Z are connected to form a series branch. A first end of the series branch is electrically connected with a first end of the mechanical switch unit K and the positive end of the DC bus capacitor. The second end of the mechanical switch unit K, the second end of the series branch and the negative end of the DC bus capacitor are electrically connected. According to the bypass signal, the turn-on time of the semiconductor switch unit Q is prior to the turn-on time of the mechanical switch unit K.

After the semiconductor switch unit Q is turned on, the voltage between the positive end and the negative end of one side of the DC/DC converter is abruptly changed. The DC bus capacitor C of the fault DC/DC converter is discharged through the series branch of the bypass circuit. The DC bus capacitors C in other DC/DC converters are charged through the series branch. The current surge in each DC/DC converter is limited by the impedance network Z in the series branch. Then, the mechanical switch unit K is turned on and keeps in turn-on state. The bypass current of the fault DC/DC converter is commutated from the series branch to the mechanical switch unit K, thereby completing the bypass of the fault DC/DC conversion circuit.

The current surge in each DC/DC converter during bypass is effectively suppressed by the bypass circuit topology of the DC/DC converter shown in FIG. 4. In addition, in the case of the DC/DC conversion, the rapidity of the bypass action is achieved by the bypass circuit topology utilizing the semiconductor switch, and the effect that the DC/DC converter in the preset state can be maintained to be controlled to exit working is achieved at the same time even if the auxiliary power supply is de-energized. After the bypass, the current is commutated to the mechanical switch unit K, and the bypass circuit has a small loss.

According to an example embodiment of the present disclosure, each of the bypass circuits further includes a diode D. The positive end of first side of the DC/DC converter is electrically coupled with an anode of the diode D, and the cathode of the diode D is electrically coupled with the positive end of the DC bus capacitor (as shown in FIG. 5). Or, the anode of the diode D is electrically coupled with the negative end of the DC bus capacitor, and the cathode of the diode D is electrically coupled with the negative end of the first side of the DC/DC converter (as shown in FIG. 6).

The working process of the bypass circuit of the DC/DC converter shown in FIG. 5 or FIG. 6 are the same as the working process of the bypass circuit of the DC/DC converter shown in FIG. 4. After the semiconductor switch unit is turned on, a current at one side of the DC/DC converter (DC bus capacitor) flows through the series branch of the bypass circuit corresponding to the DC/DC converter in the preset state. However, the current surge in the DC/DC converter (DC bus capacitor) in the preset state is suppressed due to the presence of the diode D. The current surge in other DC/DC converters (DC bus capacitors) is limited by the impedance network of the series branch. Then, the mechanical switch unit K is turned on, and the current at one side of the DC/DC converter (DC bus capacitor) is commutated to the mechanical switch unit K of the bypass circuit, and the loss of the bypass circuit is small. The bypass circuit topology shown in FIG. 5 or FIG. 6 has a smaller current surge generated in the circuit during the bypass compared with the topology shown in FIG. 4.

According to an example embodiment of the present disclosure, the corresponding control unit is configured to receive the bypass signal from the main control unit, and generate a first turn-on control signal and a second turn-on control signal according to the bypass signal. The corresponding mechanical switch unit K receives the first turn-on control signal and a control end of the corresponding semiconductor switch unit Q is configured to receive the second turn-on control signal, such that the semiconductor switch unit Q is turned on before the mechanical switch unit K.

According to an example embodiment of the present disclosure, the mechanical switch unit K is constituted by a single mechanical switch, or constituted by a plurality of mechanical switches constituted in series or in parallel.

According to an example embodiment of the present disclosure, the impedance network Z is a resistor, an inductor, a capacitor or a series-parallel structure of a resistor, a capacitor and an inductor.

According to an example embodiment of the disclosure, the semiconductor switch unit Q is constituted by a single semiconductor switch, or constituted by a plurality of semiconductor switches connected in series or in parallel.

Through the above detailed description, those skilled in the art will readily appreciate that the conversion system with a high voltage side and a low voltage side according to an exemplary embodiment of the present disclosure has one or more of the following advantages.

According to some embodiments of the present disclosure, the gain variation range of the DC/DC converter is effectively reduced, and the conversion efficiency of each DC/DC converter is improved to some extent.

According to some embodiments of the present disclosure, the solution to increase the bus voltage of the DC bus capacitor of the DC/DC converter in the release bypass state to the specified voltage from 0 when the DC/DC converter in the cold backup state is put into operation is given.

According to some further embodiments of the present disclosure, the DC/DC converter in the cold backup state can achieve bypass by a device with a small turn-on loss, such as a mechanical switch. There is no current flowing in the rest power devices of the corresponding DC/DC converter, and no loss is generated. The DC/DC converter in the working state is directly connected with the adjacent DC/DC converter through wires, and no loss of the rest additional device is generated. Therefore, the loss is reduced, which is benefit to further improve the efficiency of the conversion system.

According to some still embodiments of the present disclosure, the operation can be continued after the number of DC/DC converters in the preset state is larger than the number of the DC/DC converters in the cold backup state, which is not limited by the number of DC/DC converters in the cold backup state.

It should be understood that the present disclosure is not limited to the exact structures that have been described above and shown in the accompanying drawings, and various modifications and changes can be made without departing from the scope thereof. The scope of the present disclosure is limited only by the appended claims.

What is claimed is:

1. A conversion system with a high voltage side and a low voltage side, comprising:
    a plurality of power units, each power unit comprising:
        a plurality of DC/DC converters, wherein a first side of each of the DC/DC converters is coupled in series to the high voltage side of the conversion system, a second side of each of the DC/DC converters is coupled in parallel to the low voltage side of the conversion system, when the conversion system is in normal operation, one part of all of the DC/DC converters of the plurality of power units are in a working state and other DC/DC converters of the plurality of power units are in a cold backup state;
        a plurality of bypass circuits, wherein each bypass circuit is connected in parallel to an input side of a corresponding DC/DC converter;
        a detection unit, wherein the detection unit is connected to each of the plurality of DC/DC converters of the power unit, detects a working signal of each DC/DC converter of the power unit, and generates a detection signal according to the working signal; and
        a control unit coupled to the detection unit and each of the plurality of DC/DC converters, wherein the control unit is configured to receive the detection signal and determine whether at least one of the DC/DC converters enters into a preset state, and when the at least one of the DC/DC converters is in the preset state, the control unit outputs a preset signal; and
    a main control unit, coupled with each control unit of the plurality of power units, which is configured to receive the preset signal outputted by each respective control unit and outputs a respective bypass signal and a respective release signal to each respective control unit according to the preset signal;
    wherein, at least one of the control units controls the bypass circuit corresponding to a preset number of the DC/DC converter in the cold backup state according to the release signal corresponding to each respective bypass circuit such that the preset number of the DC/DC converter in the cold backup state is released by turning off the corresponding bypass circuit and enters a release bypass state; and at least another one of the control units controls the corresponding bypass circuit according to the corresponding bypass signal such that the corresponding DC/DC converter in the preset state is bypassed by turning on the corresponding bypass circuit.

2. The conversion system of claim 1, wherein the DC/DC converter enters into the cold backup state when the preset state is a non-fault state; and the DC/DC converter enters into a bypass state when the preset state is a fault state.

3. The conversion system of claim 1, wherein
    each of the DC/DC converters further comprises a DC bus capacitor, wherein one end of the corresponding bypass circuit and a positive end of the DC bus capacitor are electrically coupled with a positive end of the first side of the DC/DC converter, and the other end of the corresponding bypass circuit and a negative end of the DC bus capacitor are electrically coupled with a negative end of the first side of the DC/DC converter.

4. The conversion system of claim 3, wherein after one of the bypass circuits is controlled to be turned off, the DC bus capacitor of the corresponding DC/DC converter in the release bypass state is charged by the high voltage side of the conversion system, and when the voltage across the DC bus capacitor arrives at a preset voltage, the DC/DC converter in the release bypass state is controlled to enter into the working state.

5. The conversion system of claim 3, wherein the conversion system is controlled to shut down before at least one of the control units controls the preset number of the DC/DC converter in the cold backup state to be released; and the DC bus capacitor of the DC/DC converter in the release bypass state is charged by the high voltage side of the conversion system, and when the voltage across the DC bus capacitor arrives at a preset voltage, the bypass circuit corresponding to the DC/DC converter in the preset state is controlled to be turned on; and the conversion system is controlled to restart finally.

6. The conversion system of claim 5, wherein each of the DC/DC converters further comprises a voltage equalizing circuit, which is connected in parallel to the positive end and the negative end of the DC bus capacitor.

7. The conversion system of claim 3, wherein the number of the power units of the conversion system is N, the number of the DC/DC converters of each power unit is n, k DC/DC converters are in the working state and r DC/DC converters are in the cold backup state, the voltage of the high voltage side of the conversion system is $V_{DC1}$, and the voltage of the low voltage side of the conversion system is $V_{DC2}$, wherein k+r=N*n, N≥1, and n≥1,
    when the number of the DC/DC converter in which a fault occurs is larger than r, the voltage of the low voltage side of the conversion system is adjusted to $V_{DC2} \cdot k/j$, wherein j is the number of the DC/DC converter currently in the working state.

8. The conversion system of claim 3, wherein the number of the power units of the conversion system is N, the number of the DC/DC converters of each power unit is n, k DC/DC converters are in the working state and r DC/DC converters are in the cold backup state, the voltage of the high voltage side of the conversion system is $V_{DC1}$, and the voltage of the low voltage side of the conversion system is $V_{DC2}$, wherein k+r=N·n, N≥1, and n≥1, when the number of the DC/DC converter in which a fault occurs is less than or equal to r, the voltage of the low voltage side of the conversion system remains $V_{DC2}$.

9. The conversion system of claim 3, wherein the preset number is larger than, equal to or less than the number of the DC/DC converter in the preset state.

10. The conversion system of claim 1, wherein each of the DC/DC converters further comprises a DC bus capacitor, wherein a positive end of the DC bus capacitor are electrically coupled with a positive end of the first side of the DC/DC converter, and a negative end of the DC bus capacitor are electrically coupled with a negative end of the first side of the DC/DC converter, each of the bypass circuits comprises a mechanical switch unit, an impedance network and a semiconductor switch unit, wherein the semiconductor switch unit and the impedance network are connected to form a series branch, and a first end of the series branch is electrically connected with a first end of the mechanical switch unit and the positive end of the DC bus capacitor, a second end of the mechanical switch unit, a second end of the series branch and the negative end of the DC bus capacitor are electrically connected; and according to the bypass signal, the turn-on time of the semiconductor switch unit is prior to the turn-on time of the mechanical switch unit.

11. The conversion system of claim 10, wherein each of the bypass circuits further comprises a diode; wherein the positive end of the first side of the DC/DC converter is electrically coupled with the anode of the diode, and the cathode of the diode is electrically coupled with the positive end of the DC bus capacitor.

12. The conversion system of claim 10, wherein each of the bypass circuits further comprises a diode, and the anode of the diode is electrically coupled with the negative end of the DC bus capacitor, and the cathode of the diode is electrically coupled with the negative end of the first side of the DC/DC converter.

13. The conversion system of claim 10, wherein at least one of the control units is configured to receive the corresponding bypass signal from the main control unit, and configured to generate a first turn-on control signal and a second turn-on control signal according to the bypass signal, wherein the corresponding mechanical switch unit receives the first turn-on control signal and the corresponding semiconductor switch unit receives the second turn-on control signal.

14. The conversion system of claim 1, wherein the bypass circuit is in a turn-off state when the corresponding DC/DC converter is in the working state, and the bypass circuit is in a turn-on state when the corresponding DC/DC converter is in a cold backup state.

* * * * *